US010521980B2

(12) United States Patent
Soh (10) Patent No.: US 10,521,980 B2
(45) Date of Patent: Dec. 31, 2019

(54) METHOD OF DIAGNOSING OIL LEAK OF ENGINE CLUTCH IN HYBRID ELECTRIC VEHICLE

(71) Applicants: HYUNDAI MOTOR COMPANY, Seoul (KR); KIA MOTORS CORPORATION, Seoul (KR)

(72) Inventor: Hyun Jun Soh, Seongnam-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 267 days.

(21) Appl. No.: 15/603,883

(22) Filed: May 24, 2017

(65) Prior Publication Data
US 2018/0165896 A1    Jun. 14, 2018

(30) Foreign Application Priority Data
Dec. 12, 2016    (KR) .................. 10-2016-0168784

(51) Int. Cl.
| | |
|---|---|
| G07C 5/08 | (2006.01) |
| B60K 6/387 | (2007.10) |
| G01M 3/02 | (2006.01) |
| G01M 3/28 | (2006.01) |
| B60K 6/46 | (2007.10) |
| F16D 48/02 | (2006.01) |

(52) U.S. Cl.
CPC ............ *G07C 5/0808* (2013.01); *B60K 6/387* (2013.01); *G01M 3/025* (2013.01); *G01M 3/2815* (2013.01); *B60K 6/46* (2013.01); *B60Y 2200/92* (2013.01); *B60Y 2400/406* (2013.01); *F16D 25/14* (2013.01); *F16D 48/02* (2013.01); *Y10S 903/914* (2013.01)

(58) Field of Classification Search
CPC .............................. G07C 5/0808; B60K 6/387
USPC ........................................................ 702/51
See application file for complete search history.

(56) References Cited

U.S. PATENT DOCUMENTS

| | | | |
|---|---|---|---|
| 5,060,776 A | 10/1991 | Skog et al. | |
| 6,896,112 B2 | 5/2005 | Berger et al. | |
| 7,316,283 B2 * | 1/2008 | Yamamoto | B60W 10/08 180/65.235 |
| 2006/0054443 A1 * | 3/2006 | Kremer | F15B 11/0423 192/56.3 |
| 2008/0171633 A1 * | 7/2008 | Gansohr | B60W 10/02 477/175 |

(Continued)

FOREIGN PATENT DOCUMENTS

KR    10-0844567 B1    7/2008

*Primary Examiner* — Ricky Ngon
(74) *Attorney, Agent, or Firm* — Brinks Gilson & Lione (57) ABSTRACT

The present disclosure provides a method of diagnosing an oil leak of an engine clutch in a hybrid electric vehicle including: when the engine starts up in the hybrid electric vehicle, operating a hydraulic actuator provided in the engine clutch, wherein the hydraulic actuator is configured to perform engagement or disengagement between an engine and a motor; determining displacement of a piston provided in the hydraulic actuator and pressure for any displacement of a plurality of the displacements of the piston; calculating a pressure gradient based on the displacement of the piston and the pressure for any displacement of the plurality of the displacements of the piston; and determining the oil leak of the engine clutch based on the pressure gradient.

6 Claims, 11 Drawing Sheets

(56) References Cited

U.S. PATENT DOCUMENTS

2012/0199437 A1* 8/2012 Okuda ..................... B60K 6/48
                                                            192/85.63
2012/0312080 A1   12/2012 Klymenko et al.
2014/0309898 A1* 10/2014 Kitazawa ................ F16D 48/08
                                                            701/67

* cited by examiner

METHOD OF DIAGNOSING OIL LEAK OF ENGINE CLUTCH IN HYBRID ELECTRIC VEHICLE

CROSS-REFERENCE TO RELATED APPLICATION

The present application claims priority to and the benefit of Korean Patent Application No. 10-2016-0168784, filed on Dec. 12, 2016, which is incorporated herein by reference in its entirety.

FIELD

The present disclosure relates to a method of diagnosing an oil leak of an engine clutch in a hybrid electric vehicle.

BACKGROUND

The statements in this section merely provide background information related to the present disclosure and may not constitute prior art.

In general, a hybrid electric vehicle (HEV) is a vehicle that is driven using one or more different power sources. A typical hybrid electric vehicle is equipped with an engine that gains power from fossil fuel and an electric motor that is driven by electric power.

A conventional HEV has an engine clutch which connects an engine with an electric motor.

Meanwhile, in the conventional HEV, the engine clutch fails to disconnect power between the engine and the electric motor when oil leaks, thereby causing a driving force and a sudden vehicle acceleration. Accordingly, to inhibit this, a sensor is used to determine whether the oil is leaking in the engine clutch. However, even if the sensor is used, the pressure and the displacement in the engine clutch may be increased. In this case, even if the oil leaks, the oil leak may not be detected.

As a prior art, there is Korean Patent Registration No. 10-0844567.

SUMMARY

An aspect of the present disclosure provides a method of diagnosing an oil leak of an engine clutch in a hybrid electric vehicle, and more particularly, to a method of diagnosing an oil leak of an engine clutch in a hybrid electric vehicle, capable of calculating a pressure gradient based on a pressure-displacement characteristic of a piston of an hydraulic actuator provided in an engine clutch and capable of diagnosing the oil leak of the engine clutch by using the value of the pressure gradient.

In some aspects of the present disclosure, a method of diagnosing an oil leak of an engine clutch in a hybrid electric vehicle may include operating a hydraulic actuator provided in the engine clutch which is configured to perform engagement or disengagement between an engine and a motor when the engine starts up in the hybrid electric vehicle; determining displacements of a piston provided in the hydraulic actuator and pressure for any displacement of a plurality of the displacements of the piston; calculating a pressure gradient based on the displacement of the piston and the pressure for any displacement of the plurality of the displacements of the piston; and determining, based on the calculated pressure gradient, whether the oil leaks in the engine clutch.

The determining of the displacements of the piston provided in the hydraulic actuator and the pressure for any displacement of the plurality of the displacements of the piston may include determining a shift in the displacements of the piston which varies depending on operation of the hydraulic actuator.

The determining of the displacements of the piston provided in the hydraulic actuator and the pressure for any displacement of the plurality of the displacements of the piston may further include determining pressure at each of positions corresponding to the displacements of the piston.

The determining of the displacement of the piston provided in the hydraulic actuator and the pressure for any displacement of the plurality of the displacements may further include determining a position of maximum pressure among the positions corresponding to the displacements of the piston, and determining pressure of maximum displacement among the positions corresponding to the displacements of the piston.

The pressure gradient may be calculated based on the equation, $$Grad = \frac{P_{max} - P_{end}}{L(P_{max}) - L(P_{end})},$$

wherein Grad, $P_{max}$, Pend, $L(P_{max})$ and $L(P_{end})$ denote the pressure gradient (G), the maximum pressure (bar), the pressure (bar) at the maximum displacement, a displacement (um) at the maximum pressure (bar), and a displacement (um) at the Pend, respectively.

In the determining of, based on the pressure gradient, whether the oil leaks in the engine clutch, it is determined that the oil may be leaking in the engine clutch when the pressure gradient is equal to or greater than a reference value.

The method may further include warning the oil leak of the engine clutch through a dashboard of the hybrid electric vehicle when it is determined that the oil is leaking in the engine clutch.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 5:
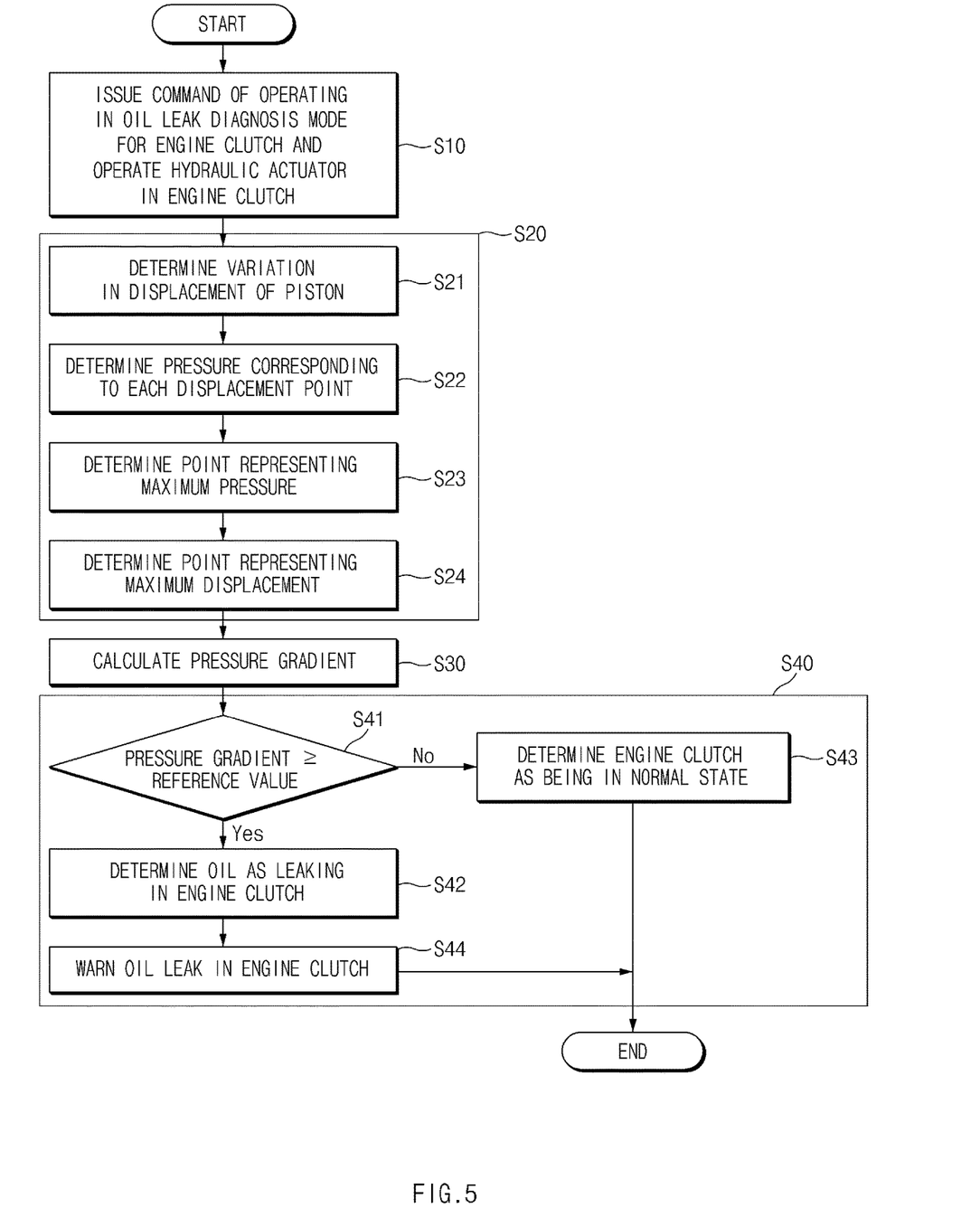
FIG. 5 is a flowchart illustrating a method of diagnosing an oil leak of the engine clutch in the HEV.

In some forms the present disclosure, as illustrated in FIG. 5, a method of diagnosing an oil leak of an engine clutch in an HEV includes starting diagnosing the oil leak of the engine clutch, determining a piston displacement and piston pressure of a hydraulic actuator, calculating a pressure gradient, and determining, based on the pressure gradient, whether the oil leaks in the engine clutch.

Figure 1:
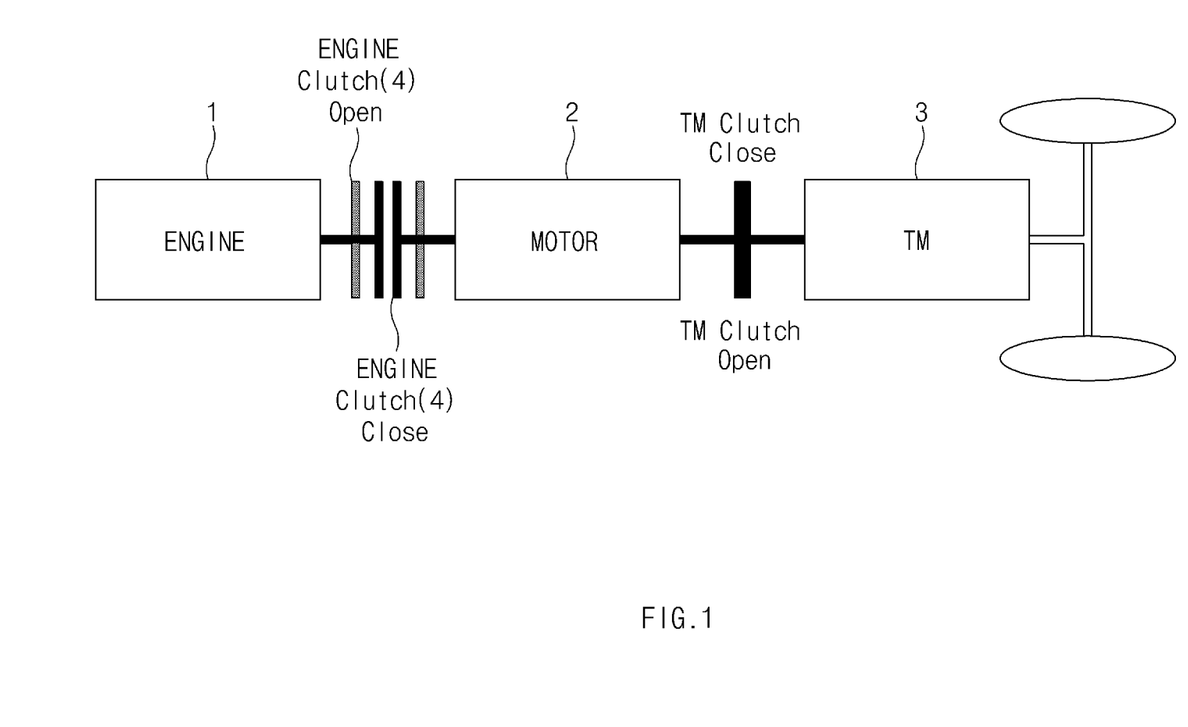
FIG. 1 is a view illustrating the structure of an HEV.

As illustrated in FIG. 1, the HEV includes an engine clutch 4 coupled to an engine 1 and an electric motor 2 and interposed between the engine 1 and the electric motor 2.

The engine clutch 4 is a device for power connection or power disconnection between the engine 1 and the electric motor 2 based on a driving condition of the HEV, and connects the engine 1 with the electric motor 2 in a hybrid electric vehicle mode (HEV mode) and disconnects the engine 1 from the electric motor 2 in an electric vehicle mode (EV mode).

For instance, the HEV transmits power to a transmission 3 only by using driving force of the electric motor 2 without using the power of the engine 1 (in an engine stop state) at starting-up or low-speed driving. Accordingly, the power connection is not desired between the engine 1 and the transmission 3, and thus the HEV travels in the EV mode.

However, since power transmission is desired between the engine 1 and the transmission 3 such that the electric motor 2 and the engine 1 generate driving force together during high-speed, acceleration, and uphill driving, the HEV travels in the HEV mode.

Figure 2:
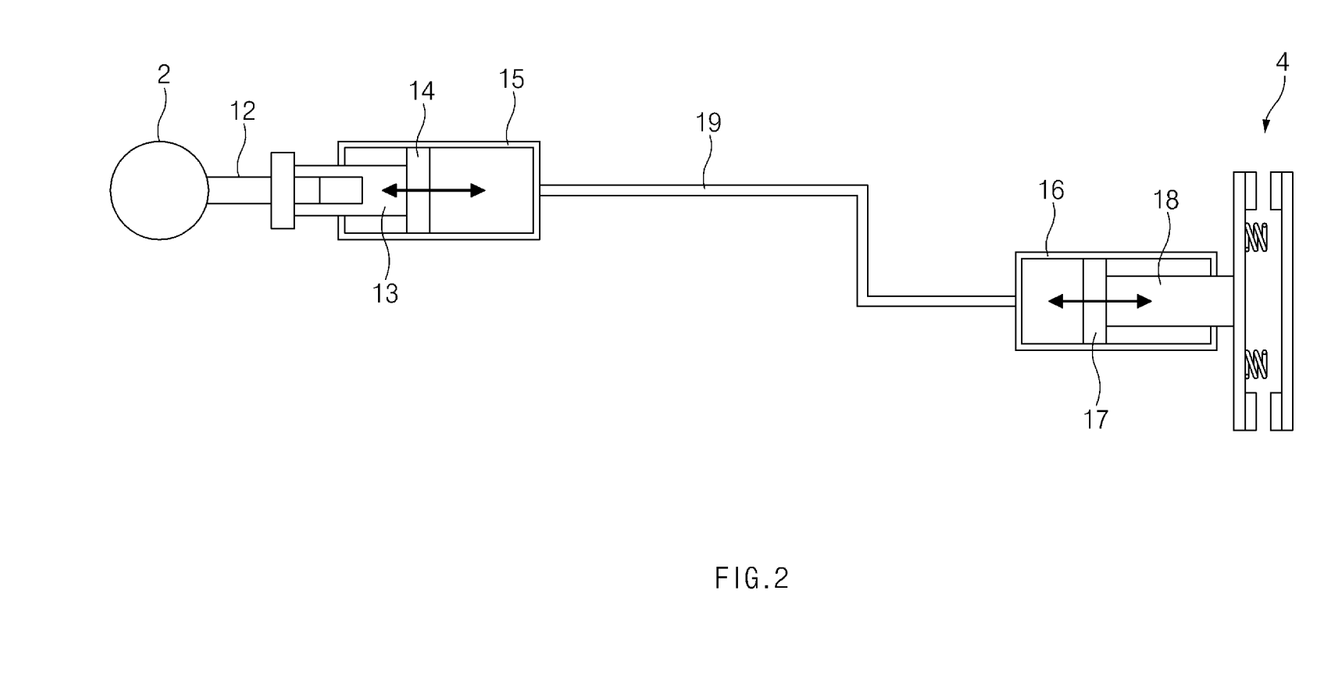
FIG. 2 is a view illustrating the operating structure of an engine clutch in the HEV.
Figure 3:
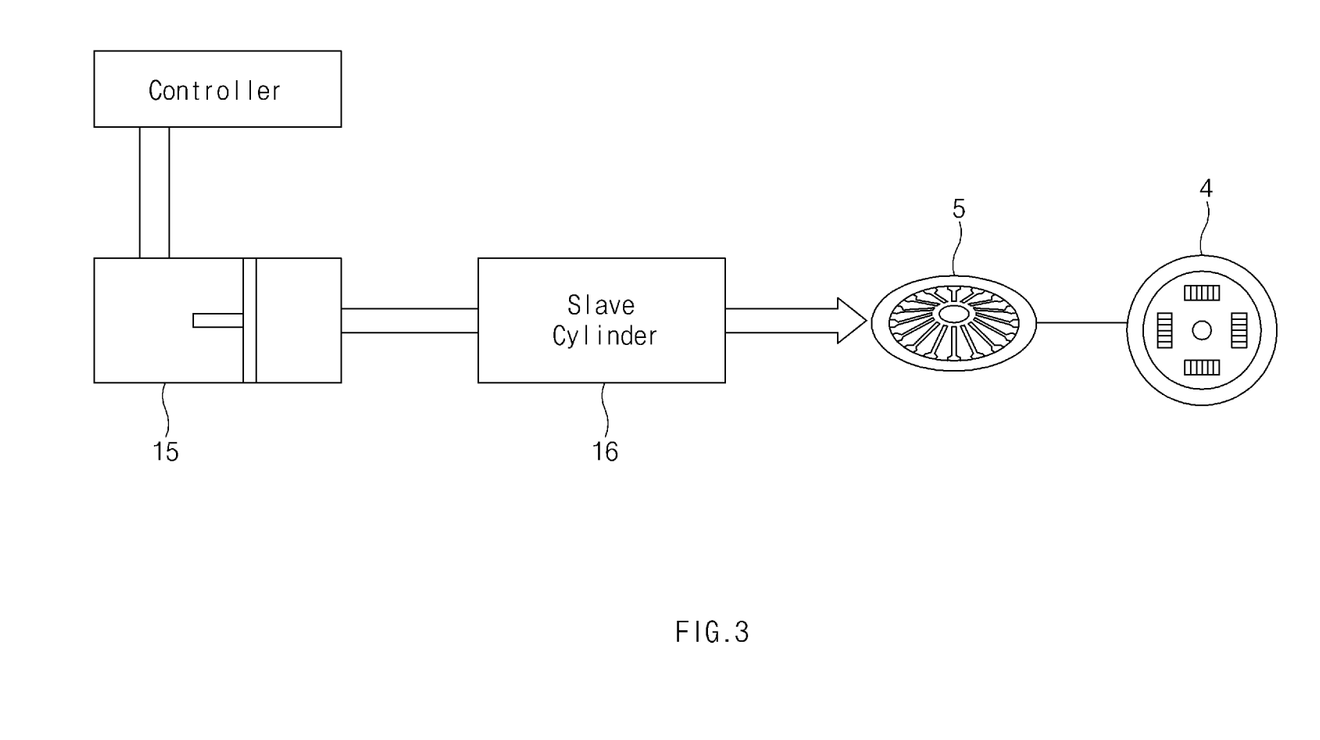
FIG. 3 is a view illustrating the procedure of transmitting hydraulic pressure of the engine clutch in the HEV.

Meanwhile, as illustrated in FIGS. 2 and 3, in the engine clutch 4, an engine disc and a motor disc are maintained in an engagement state or a disengagement state by hydraulic pressure from the driving force of the electric motor 2. In this case, when the electric motor 2 operates, a screw 12 rotates, and a nut 13 linearly moves by the rotation of the screw 12. In addition, a first piston 14 coupled to the nut 13 moves along a master cylinder 15.

In this case, when the first piston 14 moves to a right portion of the master cylinder 15, the hydraulic pressure is transmitted to a slave cylinder 16. Accordingly, a second piston 17 and a piston rod 18 protrude from the slave cylinder 16, and thus the state of the engine clutch 4 is switched from a disengagement state to an engagement state. Accordingly, power is connected between the engine 1 and the electric motor 2.

In contrast, when the first piston 14 moves to a left portion of the master cylinder 15, the hydraulic pressure is released from the slave cylinder 16, and thus the state of the engine clutch 4 is switched from the engagement state to the disengagement state. Accordingly, power is disconnected between the engine 1 and the electric motor 2.

Meanwhile, the above-described engine clutch 4 includes a normally-open engine clutch, which disconnects power between the engine 1 and the electric motor 2, and a normally-closed engine clutch which connects power between the engine 1 and the electric motor 2.

In the case of the normally-closed engine clutch, even if malfunction occurs in the electric motor 2, power may not be lost because the HEV is driven by power of the engine 1.

However, in the case of the normally-closed engine clutch, the engine 1 may start up after power is disconnected between the engine 1 and the electric motor 2. In this case, if the power disconnection fails due to the malfunction of the engine clutch 4 as illustrated in FIG. 1, the engine 1 may generate driving force and may transmit the driving force to the vehicle, thereby causing vehicle launch.

Meanwhile, most malfunctions of the engine clutch 4 are caused due to the oil leak from a hydraulic actuator of the engine clutch 4. When the oil leaks, pressure does not reach a normal level in the hydraulic actuator. Accordingly, since driving force is insufficient to push a spring device 5 (see FIG. 3) of the engine clutch 4, power disconnection fails between the engine 1 and the electric motor 2.

In some of the related art, pressure is measured through pressure and position sensors mounted in the hydraulic actuator such that the oil leak of the engine clutch 4 is determined. If the measured pressure is equal to or less than a reference value, the oil is determined as leaking because the measured pressure is abnormal. However, such a manner is to determine only whether the pressure is low. Accordingly, in such a manner, it was impossible to detect the oil leaks even though the oil leaks, provided that the pressure was above the reference value.

Figure 4:
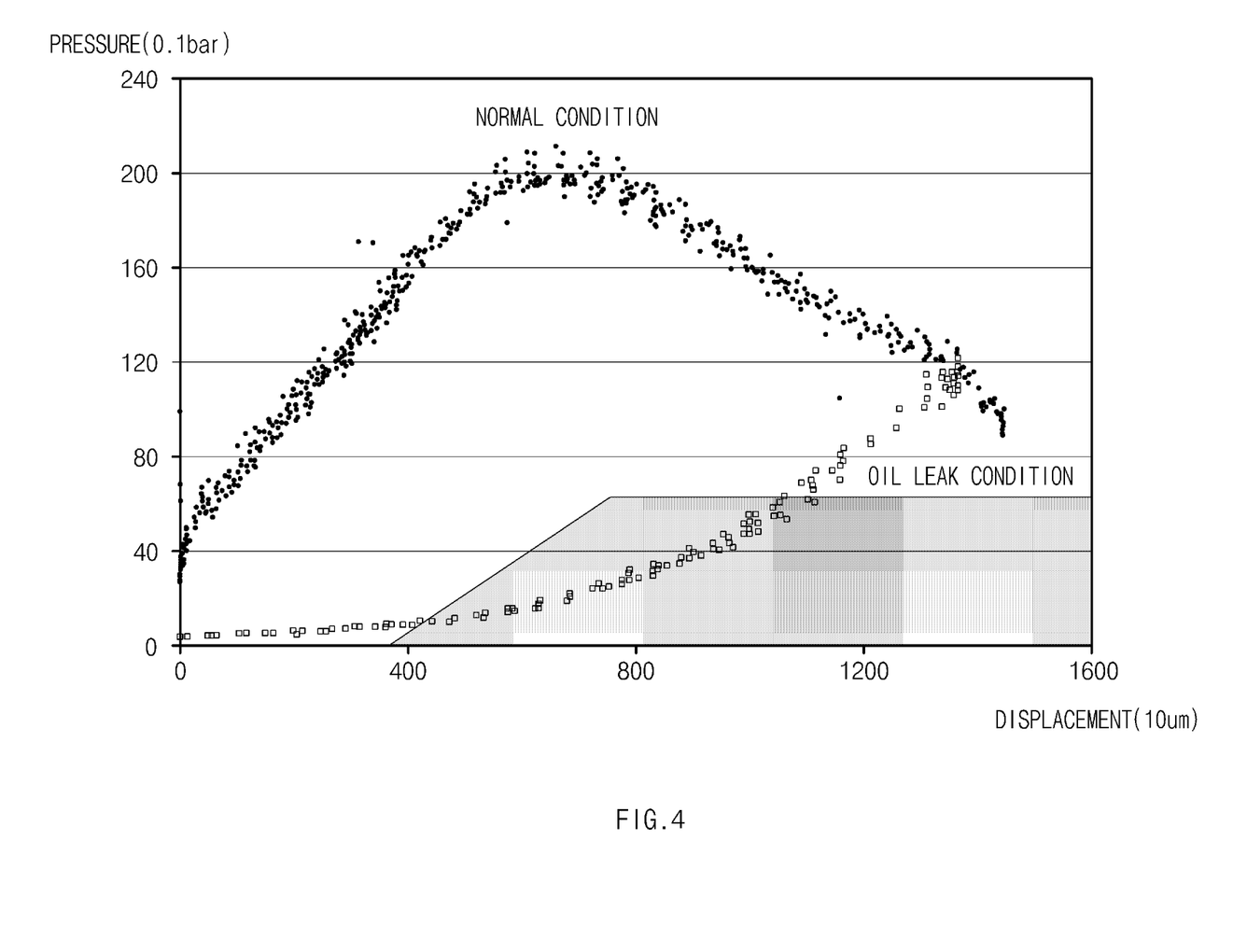
FIG. 4 is a graph illustrating a pressure-displacement characteristic when the hydraulic actuator of the engine clutch in the HEV is under a normal condition or an oil leak condition.

In addition, as illustrated in FIG. 4, when the engine clutch 4 is in the normal state, the piston displacement of the hydraulic actuator represents positive and negative gradients about a top dead center (TDC). When oil leaks in the engine clutch 4, the piston displacement represents only the positive gradient. In the oil leak detection manner of the related art, the oil leak may not be detected when the pressure and the displacement are increased even though the oil leaks. However, in some forms of the present disclosure, a pressure gradient may be calculated based on a pressure-displacement characteristic in the hydraulic actuator provided in the engine clutch, and the oil leak of the engine clutch may be diagnosed based on the value of the calculated gradient.

Meanwhile, in some forms of the present disclosure, diagnosing the oil leak of the engine clutch, which performs engagement or disengagement between the engine and the electric motor, starts at engine start-up in the HEV (S10).

In this case, when the engine operates, the hydraulic actuator provided in the engine clutch operates. In operation S10, diagnosing the oil leak starts while the hydraulic actuator operates.

The displacement of a piston provided in the hydraulic actuator and the pressure for each displacement are determined after diagnosing the oil leak (S20).

In this case, the piston displacement and the piston pressure of the hydraulic actuator are determined because the spring device applied to the engine clutch is coupled to the piston and moved by hydraulic pressure, and the displacement of the spring device is similar to that of the piston. Accordingly, the oil leak of the hydraulic actuator may be determined by determining the piston displacement and the piston pressure allowing the pressure measurement.

Figure 7:
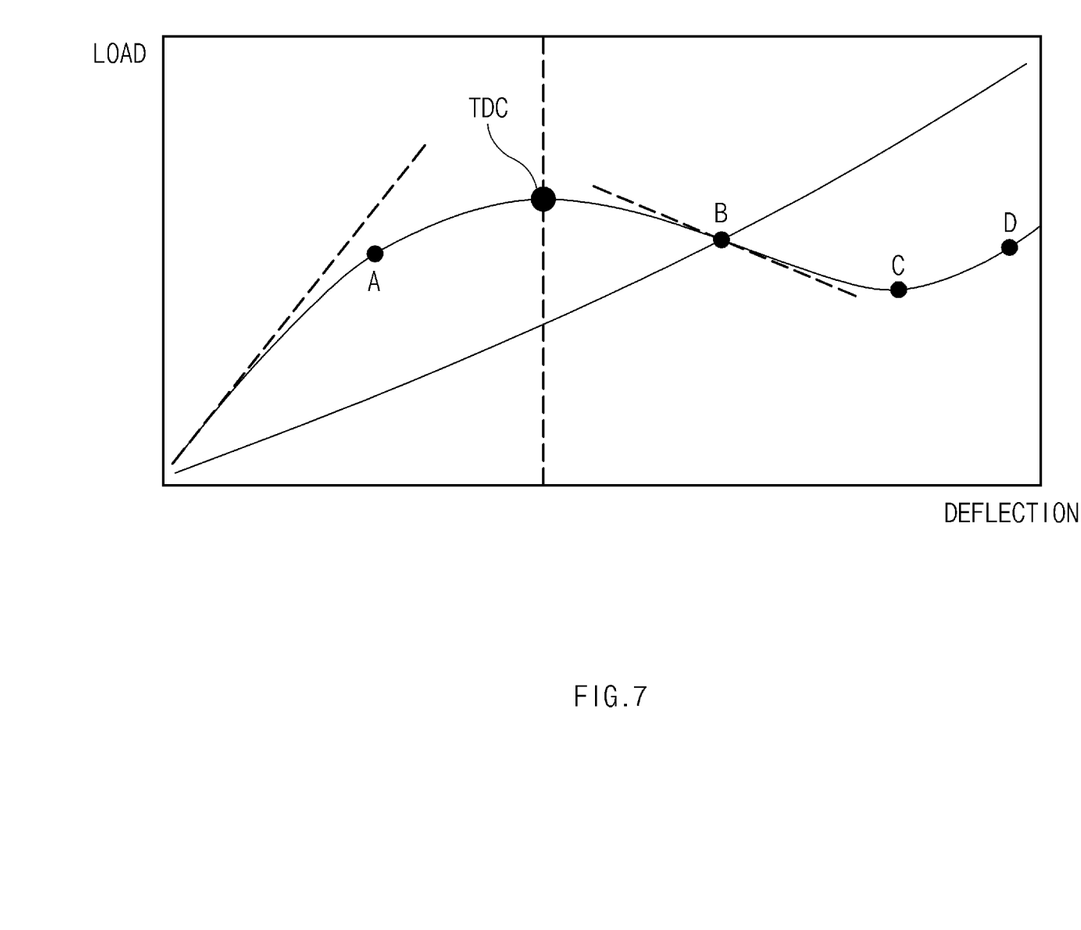
FIG. 7 is a graph illustrating a deflection characteristic of a diaphragm spring for a load in the method of diagnosing the oil leak of the engine clutch in the HEV.
Figure 8A:
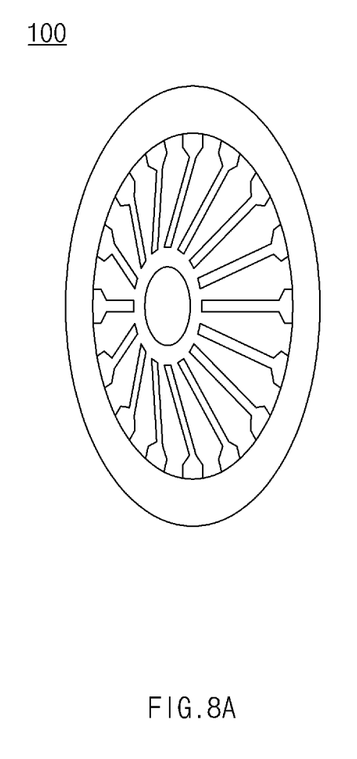
FIGS. 8A and 8B are views illustrating the deflection state of the diaphragm spring in the method of diagnosing the oil leak of the engine clutch in the HEV.
Figure 8B:
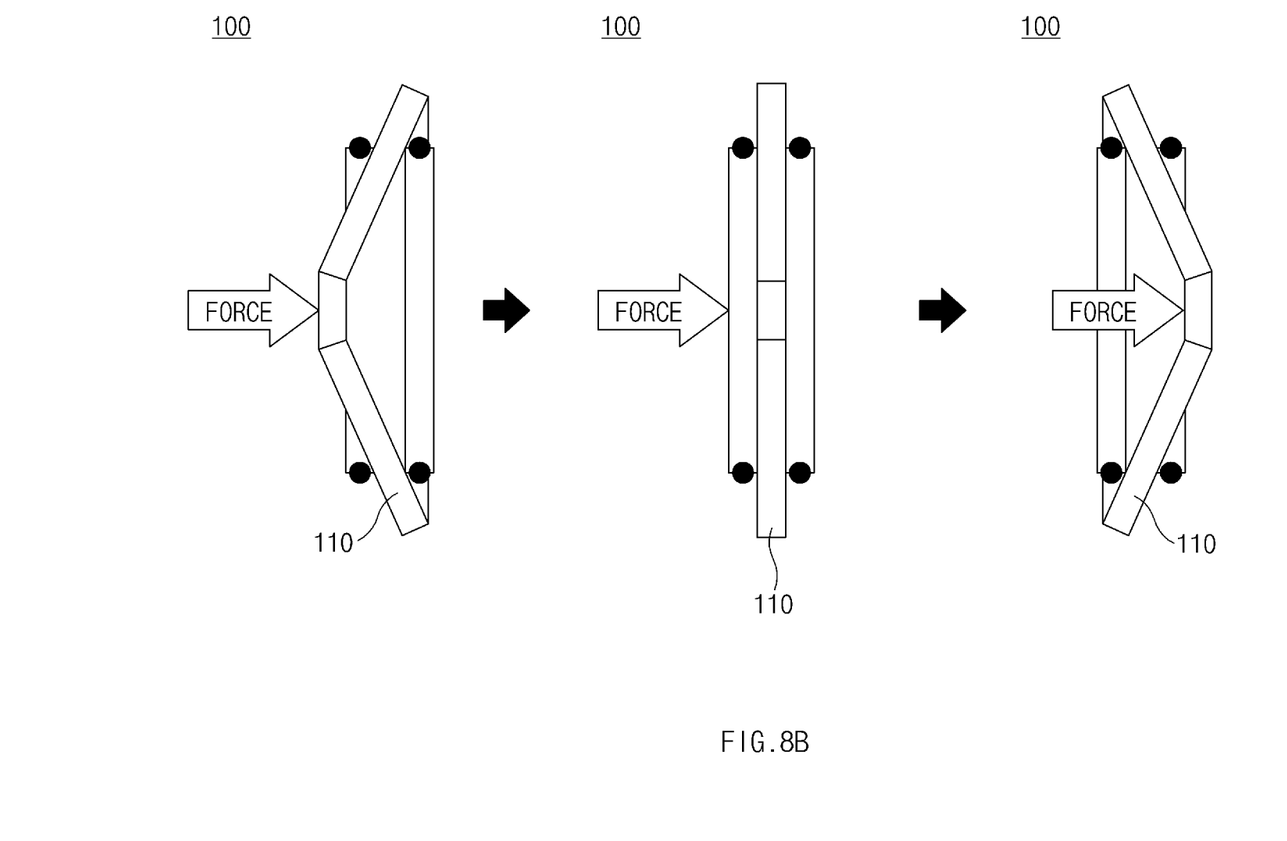

Meanwhile, the spring device applied to the engine clutch is a diaphragm spring 100 which represents a non-linear characteristic in the deflection for a load as illustrated in FIG. 7. As illustrated in FIGS. 8A and 8B, an elastic member 110 is moved as external force is applied thereto. After a top dead center (TDC) which is the maximum load position, a load is reduced, and the gradient (slop) of the load over a displacement has a negative value. Accordingly, the displacement of the diaphragm spring may be stably maintained.

Figure 9:
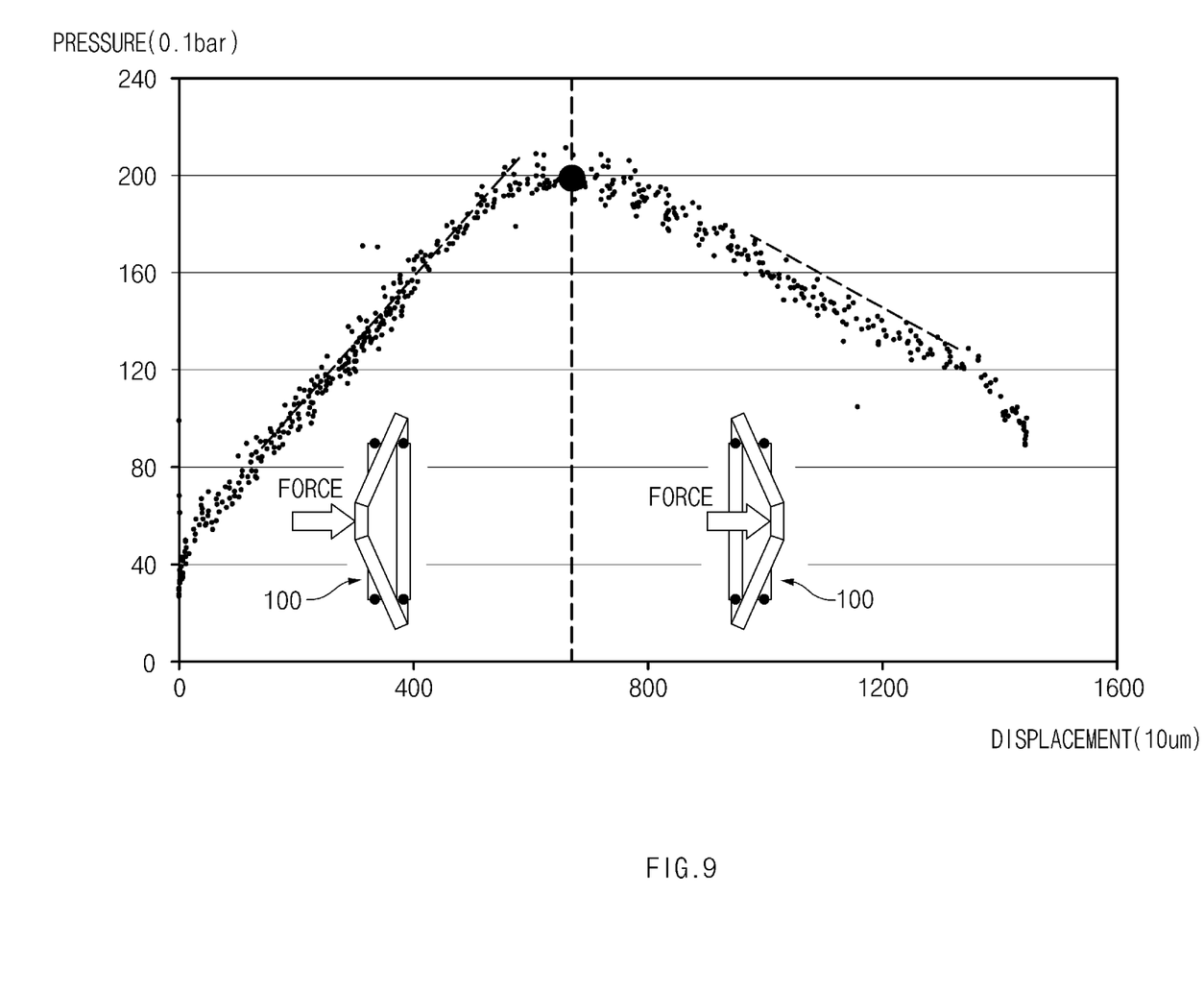
FIG. 9 is a graph illustrating a deflection state and a pressure-displacement characteristic in the case of the diaphragm spring under the normal condition in the method of diagnosing the oil leak of the engine clutch in the HEV.

As illustrated in FIG. 9, due to the non-linear load-displacement characteristic in the diaphragm spring 100, even the gradient of the pressure over the displacement of the piston has a positive value before the TDC and has a negative value after the TDC when the engine clutch having the diaphragm spring 100 applied thereto operates.

Figure 10:
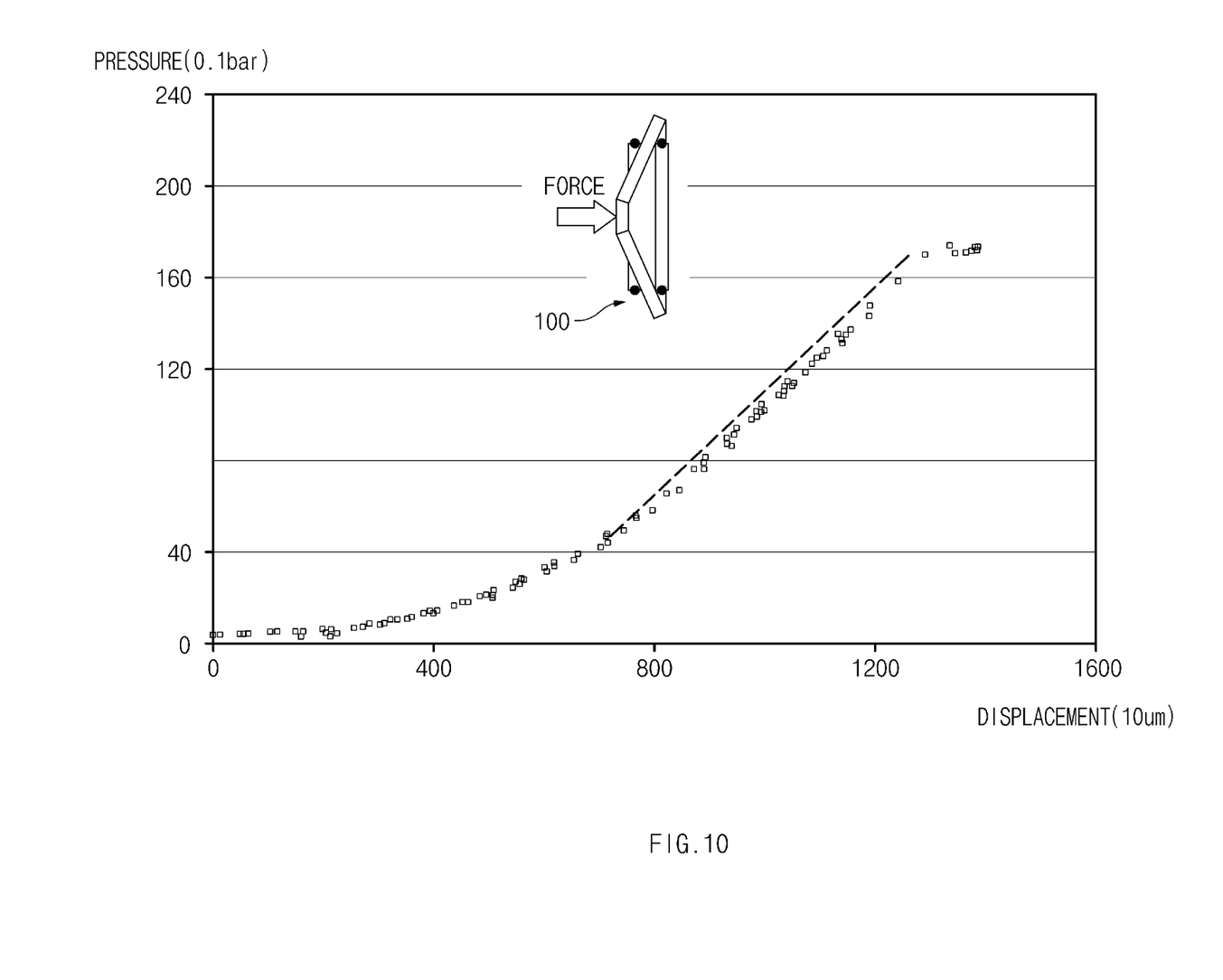
FIG. 10 is a graph illustrating a deflection state and a pressure-displacement characteristic when the diaphragm spring is under the oil leak condition in the method of diagnosing the oil leak of the engine clutch in the HEV.

In this case, when oil leaks in the hydraulic actuator and thus pressure is insufficient to push the piston, as illustrated in FIG. 10, the displacement of the diaphragm spring 100 does not reach the TDC and thus the gradient of the pressure over the displacement has a positive value while representing a linear characteristic, different from that of the diaphragm spring 100 in a normal state.

Accordingly, the gradient characteristic is divided into positive and negative gradient characteristics about the TDC on the pressure-displacement curve of the hydraulic actuator provided in the engine clutch to which the diaphragm spring 100 is applied. If the gradient of the pressure over the displacement is not the negative gradient after the TDC, oil may be determined as leaking.

The operation of determining the displacement of the piston provided in the hydraulic actuator and the pressure for each of displacements (S20) includes operations of determining shift in the displacement of the piston (S21), determining pressure at each position corresponding to the shifted displacement (S22), determining a position representing the maximum pressure (S23), and determining a position representing the maximum displacement (S24).

The operation of determining the shift in the displacement of the piston (S21) includes an operation of determining displacements of the piston varied with hydraulic pressure as the hydraulic actuator operates.

The operation of determining the pressure at each position corresponding to the shifted displacement (S22) includes an operation of determining the pressure for each of displacements of the piston, which are varied.

The operation of determining the position representing the maximum pressure (S23) includes an operation of determining the pressure and the displacement at the position, which represents the highest pressure among positions of the determined displacements of the piston as coordinates.

The operation of determining the position representing the maximum displacement (S24) includes an operation of determining the pressure and the displacement at a position, which represents the maximum displacement among the determined positions of the displacements of the piston as coordinates.

Then, a pressure gradient is calculated based on the determined displacements and pressures for the displacements (S30). In operation S30, the pressure gradient is calculated based on the coordinates of the displacements and the pressures determined in operation S20, thereby determining whether the oil leaks in the engine clutch.

The pressure gradient is calculated through Equation 1.

$$Grad = \frac{P_{max} - P_{end}}{L(P_{max}) - L(P_{end})} \qquad \text{Equation 1}$$

In Equation 1, Grad, Pmax, Pend, L(Pmax), and L(Pend) denote a pressure gradient (G), the maximum pressure (bar), the pressure (bar) at the maximum displacement, a displacement (um) at the maximum pressure (bar), and the displacement (um) at the Pend, respectively.

The equation is the modification of a y-axis increment over an x-axis increment, which is a formula of calculating a gradient. In this case, the gradient is negative if the result of the equation is a negative value, and positive if the result of the equation is a positive value.

Next, it is determined whether the oil leaks in the engine clutch or the engine clutch is in a normal state (S40), based on the pressure gradient calculated in the operation of calculating the pressure gradient (S30).

In this case, preferably, it is determined that the oil leaks in the engine clutch if the pressure gradient is equal to or more than a reference value.

In other words, on the assumption that the critical value is set to zero, if the pressure gradient is equal to or more than zero, the oil is determined as leaking in the engine clutch. If the pressure gradient is a negative value, the piston is determined as being the normal state.

Meanwhile, in the operation of determining whether the oil leaks in the engine clutch or the engine clutch is in a normal state (S40), the oil leak is determined by determining whether the pressure gradient is a positive value when oil leak is determined (S41), determining the oil as leaking in the engine clutch when the pressure gradient is equal to or more than zero (S42), and determining the engine clutch as being in the normal state (S43) when the pressure gradient has a negative value.

Figure 6:
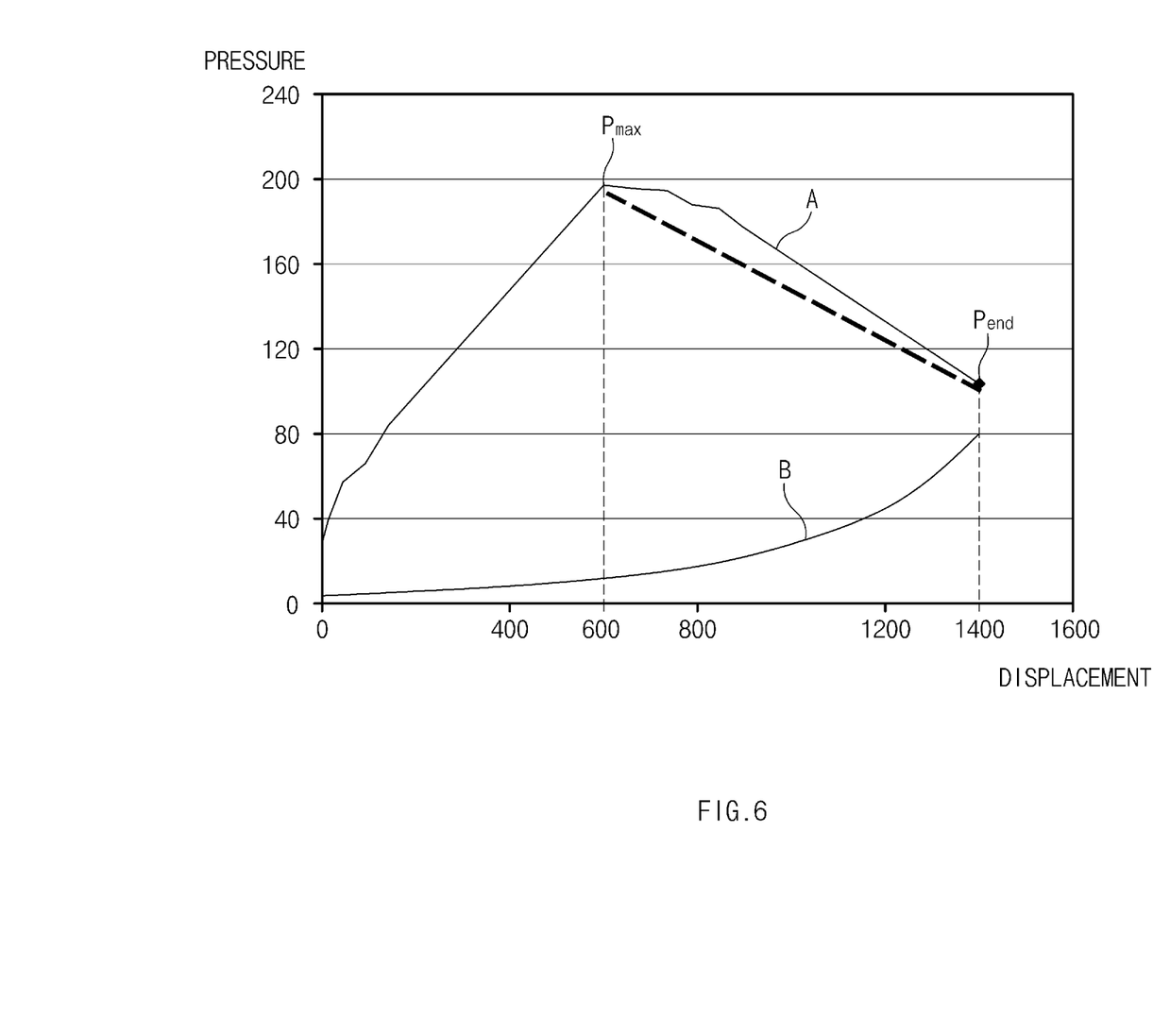
FIG. 6 is a graph illustrating a pressure-displacement characteristic in the hydraulic actuator under the normal condition or the oil leak condition in the method of diagnosing the oil leak of the engine clutch in the HEV.

For instance, the pressure and the displacement of the piston in the hydraulic actuator represent the relationship in the form of curve A as illustrated in FIG. 6. In other words, it is recognized that the maximum pressure $P_{max}$ after the TDC is 200, the pressure $P_{end}$ at the maximum displacement is 100, the displacement $L(P_{max})$ at the maximum pressure is 600, and the displacement L(Pend) at the Pend, which is the maximum displacement, is 1400. In this case, the pressure gradient is −⅛, that is, a negative value, which represents that the engine clutch is in the normal state.

In addition, in the case of curve B in FIG. 6, the maximum pressure $P_{max}$ and the pressure $P_{end}$ at the maximum displacement are 80, and the displacement $L(P_{max})$ at the maximum pressure and the displacement $L(P_{end})$ at the Pend, which is the maximum displacement, are 1400. Accordingly, the pressure gradient calculated in Equation 1 is zero, which represents that the oil leaks in the engine clutch.

Although curve B has a positive gradient in FIG. 6, the calculated pressure gradient is zero. This is because Equation 1 is not the typical formula of calculating the gradient of a y-axis increment over an x-axis increment, but relates to the pressure and the displacement based on the maximum pressure and the maximum displacement. Accordingly, the gradient recognized from the drawing makes a difference from the calculated pressure gradient.

Meanwhile, when it is determined that the oil leaks in the engine clutch in the operation of determining whether the oil leaks in the engine clutch when the pressure gradient is zero or more (S42), next operation S44 is performed and thus oil leak of the engine clutch is warned through a dashboard of the vehicle, thereby previously inhibiting vehicle accident from being caused due to the failure in the engine clutch.

As described above, in the HEV of the present disclosure, the operation of diagnosing the oil leak of the engine clutch, which performs engagement or disengagement between the engine and the electric motor, starts at engine start-up. Then, the displacement and the pressure of the piston provided in the hydraulic actuator of the engine clutch are determined, and the pressure gradient is calculated. Based on the calculated pressure gradient, it is determined whether oil leaks in the engine clutch, or the engine clutch is in the normal state. Accordingly, the possibility of detecting the oil leak of the engine clutch is increased, and thus the reliability of the inspection for the oil leak is improved.

As described above, in some forms of the present disclosure, the pressure gradient is calculated based on a pressure-displacement characteristic of the piston of the hydraulic actuator provided in the engine clutch. If the calculated pressure gradient is equal to or more than a critical value, the engine clutch is diagnosed with the oil leak. Accordingly, the productivity of the engine clutch may be improved.

In addition, in the related art, a detection region is set, and the pressure in the detection region is compared with reference pressure such that the oil leak is detected. Accordingly, the oil leak is not detected in a region beyond the detection region. However, in some forms of the present disclosure, the pressure gradient is calculated by using the maximum pressure based on displacement positions of the piston and the pressure corresponding to the maximum displacement. Therefore, the oil leak may be detected throughout the whole region and the oil leak detection ability is improved.

In addition, the reliability of the oil leak diagnosis for the engine clutch may be improved, thereby inhibiting a vehicle accident caused by the malfunction in the engine clutch. Eventually, vehicle safety may be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of diagnosing an oil leak of an engine clutch in a hybrid electric vehicle, the method comprising:
   when an engine starts up in the hybrid electric vehicle, operating a hydraulic actuator provided in the engine clutch, wherein the hydraulic actuator is configured to perform engagement or disengagement between the engine and a motor;
   determining displacement of a piston provided in the hydraulic actuator and pressure for any displacement of a plurality of the displacements of the piston;
   calculating a pressure gradient based on the displacement of the piston and the pressure for any displacement of the plurality of the displacements of the piston; and
   determining the oil leak of the engine clutch based on the pressure gradient,
   wherein the pressure gradient is calculated based on the equation:

$$Grad = \frac{P_{max} - P_{end}}{L(P_{max}) - L(P_{end})},$$

wherein Grad, $P_{max}$, Pend, $L(P_{max})$, and end, $L(P_{end})$ denote the pressure gradient (G), maximum pressure (bar) among the determined pressure, pressure (bar) at the maximum displacement among the determined displacement, displacement (um) at the $P_{max}$, and displacement (um) at the $P_{end}$, respectively.

2. The method of claim 1, wherein determining the displacement of the piston provided in the hydraulic actuator and the pressure for any displacement of the plurality of the displacements of the piston comprises:
   determining a shift in the displacement of the piston, wherein the displacement of the piston varies depending on operation of the hydraulic actuator.

3. The method of claim 2, wherein determining the displacement of the piston provided in the hydraulic actuator and the pressure for any displacement of the plurality of the displacements of the piston further comprises:
   determining pressure at any position of a plurality of positions corresponding to the displacement of the piston.

4. The method of claim 3, wherein determining the displacement of the piston provided in the hydraulic actuator and the pressure for any displacement of the plurality of the displacements of the position further comprises:
   determining a position of the maximum pressure among the plurality of the positions corresponding to the displacement of the piston; and
   determining a pressure of the maximum displacement among the plurality of the positions corresponding to the displacement of the piston.

5. The method of claim 1, wherein determining the oil leak of the engine clutch based on the pressure gradient further comprises:
   when the pressure gradient is equal to or greater than a reference value, determining that the oil is leaking in the engine clutch.

6. The method of claim 1, further comprising:
   when it is determined that the oil is leaking in the engine clutch, warning the oil leak of the engine clutch through a dashboard of the hybrid electric vehicle.

* * * * *